Patented July 4, 1950

2,513,638

UNITED STATES PATENT OFFICE 2,513,638

COMPOSITIONS CONTAINING AMYLACEOUS MATERIALS AND A DIHYDROXYPHOSPHOLIPID

Elmer F. Glabe, Chicago, Ill., assignor to Food Technology, Inc., Chicago, Ill., a corporation of Illinois No Drawing. Application August 21, 1948, Serial No. 45,562

20 Claims. (Cl. 99—134)

This invention relates in general to the manufacture of candy, and more particularly, to an improved molding composition for candies.

A large percentage of the candy manufactured today is prepared by molding the candy into certain desired shapes; for instance, fondant centers for boxed chocolates, creams and jellies, and caramels of various kinds are prepared by introducing the unshaped ingredients into a mold. Very large quantities of amylaceous materials or starches are employed in the preparation of the molds into which the candy is placed.

A typical starch mold may be prepared as follows:

A pan is filled with starch to an appropriate depth and the starch is smoothed with a large spatula or steel blade of some kind. If, for example, the manufacturer is intending to make fondant centers, which are later to be chocolate coated, he will take a rack holding a large number of molds of the same size and shape as the fondant centers which he wishes to prepare. This master mold is impressed into the pan of starch and upon withdrawal leaves a large number of holes of the exact size and shape of the desired fondant centers. A similar procedure is followed in the preparation of molds for jellies or caramels.

The candy center material is meanwhile prepared for introduction into the starch mold. When the fudge or the jelly has been cooked and flavored to the desired extent, it is introduced into the various indentations in the starch mold. The poured material then takes the shape of the hole in the starch pan. After the molded candies are completely set and cured, the entire pan is emptied into a brush type sifter, in which the major portion of the starch is gently brushed from the surface of the candies. The clean candies and the recovered starch then proceed to further processing operations.

The amount of starch used in starch molding operations is very large and accounts for a considerable proportion of the cost of the finished candy. The starch is ordinarily used as many times as possible, until the characteristics of the starch become undesirable for further molding. With each use of the starch the moisture content builds up to a point where the starch becomes too lumpy for further use. The starch will also begin to adhere to the candy in such a manner as to make removal difficult. At this point the starch must be discarded.

One of the problems with which candy manufacturers are continually faced is that the starch fails to take on the sharp features of the master mold. Hence, a piece of candy will not have the desired sharp features when it has been processed in an inferior starch mold.

It is an object of this invention to provide an improved molding composition for candies.

Another object of this invention is to provide a molding composition which will take on the sharp features of the master mold and retain such features after the addition of candy thereto.

Another object of this invention is to provide a molding composition which does not adhere strongly to the candy and may be readily recovered for reuse.

A further object of this invention is to provide a molding composition which does not become lumpy as the moisture content increases.

A still further object of the invention is to provide a molding composition which is readily recoverable and which may be used a large number of times before discarding.

Another object of this invention is to provide a molding composition which may readily be molded into stiff molds.

Other objects and advantages are contemplated by the invention as will become more apparent from the following examples and description.

The present invention relates to a new molding composition for candies which is unaffected by large amounts of moisture, and which does not become hard or lumpy when the moisture content is increased. My new molding composition may be easily processed into molds which are not crumbly, but which are easily recoverable after the molding operation. In addition, my novel molding composition takes on the sharp features of a master mold and retains the sharp features throughout the candy molding operation. Since the moisture content does not seriously affect the characteristics of the molding composition, it may be reused a very large number of times before it must be discarded.

The new molding composition is made by incorporating with an amylaceous material a dihydroxyphospholipid compound. All of the common starches, as for instance, corn starch, wheat starch, tapioca, potato starch, sago starch, arrow root starch, etc., may be employed as the source of amylaceous material in the molding composition. The dihydroxyphospholipids are compounds that are somewhat waxy in nature, are completely edible, and assert a very unusual power of binding fats and water. In addition, the dihydroxyphospholipids show a remarkable affinity for starch and the protein which is present in an ordinary starch composition.

As a specific example of the unusual results which may be obtained by the practice of this invention, a molding composition for candies is prepared by incorporating into potato starch a small amount of a dihydroxyphospholipid. Potato starch normally has a moisture content of about 15% to 18%, which is somewhat higher than the moisture content of other starches, but this in no way seriously affects the properties of the molding composition. A molding composition comprising 99.75% of potato starch and 0.25% of a dihydroxyphospholipid, exhibits outstanding molding characteristics when used for candy molds. A pan of this composition holds the individual mold shapes with a unique degree of clarity and sharpness. Furthermore, the candy pieces do not exert as great an affinity for this composition as they do for plain starch. As a result, less of the starch is wasted by adhering to the candy pieces to be lost in the dusting operation. I have found further that this new composition may be reused a greater number of times than is possible with plain starch.

The incorporation of as little as 0.05% by weight of a dihydroxyphospholipid, based upon the weight of the molding composition, is appreciably effective in making molded compositions having the previously described unique molding characteristics. From 0.15% to 0.25% by weight of a dihydroxyphospholipid in a starch molding composition results in a composition having the most desirable overall characteristics. As the quantity of dihydroxyphospholipid is increased to as high as 5% by weight of the molding composition, the product becomes quite stiff in nature and can be molded with the fingers into shapes and forms which have a number of applications in the preparation of odd shaped molds.

The characteristics of the molded composition which contains a high percentage (up to 5%) of a dihydroxyphospholipid make the composition useful in other places where molding materials are employed. It is possible to make attractive molding compounds for use by children which would have all of the characteristics of ordinary molding clay, and, at the same time, would be non-poisonous. Harmless vegetable colorings may be added to make the starch molding compositions in bright and attractive colors which are impossible to achieve in the ordinary molding clays.

The dihydroxyphospholipids may be incorporated in a number of ways; for example, the material may be physically mixed with the starch in the dry form.

The dihydroxyphospholipids may be obtained by treating the phosphatide under conditions which bring about hydroxylation of the phosphatide. Phosphatides have the general formula

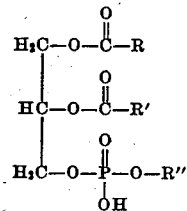

where R and R' are the hydrocarbon radicals of the higher fatty acids, some of which are unsaturated and R'' is either a choline radical, a cholamine radical or a serine radical. The phosphate radical may occupy either the alpha or beta position. In the lecithins, R'' is the choline radical, and in the cephalines R'' is the cholamine radical.

It has been found that hydroxylation of such molecules at a double bond of the unsaturated fatty acids can be accomplished by treating the phosphatides with hydrogen peroxide, preferably in the presence of a water soluble aliphatic carboxylic acid, e. g., acetic, lactic, citric, tartaric or the like, or with the peracids of such water soluble aliphatic carboxylic acids, e. g., peracetic, perlactic, or the like. As indicated, it is preferred to treat either with a mixture of hydrogen peroxide and edible acids or with the peracid of an edible acid since the reaction is more economical and a greater degree of hydroxylation can be obtained. However, hydrogen peroxide alone produces beneficial results. When acid conditions are employed, it is preferred not to use such an amount as will result in a pH value below 3 for a 1% aqueous solution of the mixture, since the phosphatides are easily decomposed under severe acid conditions. Greater amounts of acid may be used, however, where a greater degree of hydroxylation and water solubility are desired, although there is the danger of some decomposition taking place.

The resulting product has a decreased unsaturation as measured by the iodine value, indicating hydroxylation. It has not been possible, however, to directly measure the hydroxyl groups, since the conditions for such measurement result in decomposition of the phosphatide. However, the product has been hydrolyzed and acetyl values determined on the fatty acids recovered. These show a substantial increase in acetyl values over the acids recovered from the untreated phosphatides, and clearly indicate that hydroxylation occurs on the fatty acid portion. Dihydroxystearic acid has also been recovered from the hydrolysate of the treated material.

In a specific example 100 grams of crude soy bean lecithin, having an iodine value of 95.7, were warmed to approximately 50 degrees C., at which temperature it melts. Three (3) grams of 75% lactic acid were added and mixed in and 14 grams of 100 volume $H_2O_2$ were added slowly with agitation while maintaining the temperature at 50 degrees C. This mixture was stirred for one hour at 50 degrees C. and then dried under a vacuum of 27.5 inches until the moisture content was less than 1%. The iodine value of the resulting material was 84.0. This material is easily emulsified in water and is a very effective emulsifying agent.

The dihydroxyphospholipid emulsifying composition has also been prepared by mixing together 2500 grams of lecithin and 35.5 grams of 75% lactic acid. Then 175 grams of 100 volume hydrogen peroxide was added slowly over a period of 30 minutes. The emulsifier was stirred for one hour and dried under vacuum. At this point 47 grams of a 10% sodium hydroxide solution was added slowly and the temperature controlled so that it did not go above 70 degrees C. The drying was then continued until the moisture content was less than 1%. The resultant material had an iodine value of 84 and showed greater improved properties as an emulsifying agent.

In still another method for making the dihydroxyphospholipid emulsifying composition 495 pounds of crude soybean lecithin was warmed to 55 degrees C. with mixing. Then 15 pounds of 75% lactic acid was added and 70 pounds of 100 volume hydrogen peroxide was added slowly over a period of 30 minutes. The mixture was stirred for one hour and dried under vacuum. Then 6.5 pounds of flake caustic in a 10% water solution was added and stirred in well. This mixture was then dried under vacuum. In all, 528 pounds of finished material was obtained having an iodine value of 85.3 and exhibiting superior emulsifying properties.

The phosphatide materials are preferably hydroxylated from 5% to 25%, depending upon the concentration of materials used, the time and the temperature. It is important that the temperature be maintained below 75 degrees C. in order to prevent decomposition of the raw materials. The dihydroxyphospholipids exhibiting the best results are obtained by hydroxylating to about 10% as measured by reduction in the iodine value.

It will be apparent from the foregoing disclosure that the new molding composition, which is the subject of this invention, has novel and unusual characteristics that have not been achieved in the art prior to this invention. Stable molds having the desired sharp features of the master mold are readily available by the practice of this invention. Additionally, the molding composition may be easily recovered because it does not adhere strongly to the molded candy. The molding composition may be used over and over a larger number of times than a standard molding starch. The resulting saving in cost is an important economic feature of the invention.

The invention is hereby claimed as follows:

1. A composition comprising an intimate mixture of an amylaceous material and a dihydroxyphospholipid.

2. A composition comprising an intimate mixture of an amylaceous material and a quantity of a dihydroxyphospholipid sufficient to stiffen the amylaceous material.

3. A molding composition comprising an intimate mixture of an amylaceous material and from 0.05% to 5.0% by weight of a dihydroxyphospholipid based on the weight of the molding composition.

4. A molding composition for candies comprising an intimate mixture of a starch and from 0.15% to 0.25% by weight of a dihydroxyphospholipid based on the weight of the molding composition.

5. A molding composition for candies comprising an intimate mixture of potato starch and from 0.15% to 0.25% by weight of a dihydroxyphospholipid based on the weight of the molding composition.

6. A composition for molding into stiff figures comprising an intimate mixture of an amylaceous material and up to 5% by weight of a dihydroxyphospholipid based on the weight of the molding composition.

7. The method of making a molding composition which comprises intimately mixing with an amylaceous material a dihydroxyphospholipid.

8. The method of making a molding composition which comprises intimately mixing with an amylaceous material a quantity of a dihydroxyphospholipid sufficient to stiffen the amylaceous material.

9. The method of making a molding composition which comprises intimately mixing with an amylaceous material from 0.05% to 5.0% by weight of a dihydroxyphospholipid based on the weight of the molding composition.

10. The method of making a molding composition which comprises intimately mixing with an amylaceous material from 0.15% to 0.25% by weight of a dihydroxy phospholipid based on the weight of the molding composition.

11. The method of making a molding composition for candies which comprises intimately mixing with potato starch from 0.15% to 0.25% by weight of a dihydroxyphospholipid based on the weight of the molding composition.

12. The method of molding candies which comprises introducing candy into a mold consisting essentially of an intimate mixture of an amylaceous material and a dihydroxyphospholipid.

13. The method of molding candies which comprises introducing candy into a mold consisting essentially of an intimate mixture of an amylaceous material and a quantity of a dihydroxyphospholipid sufficient to stiffen the amylaceous material.

14. The method of molding candies which comprises introducing candy into a mold consisting essentially of an intimate mixture of an amylaceous material and from 0.05% to 5.0% by weight of a dihydroxyphospholipid based on the weight of the molding composition.

15. The method of molding candies which comprises introducing candy into a mold consisting essentially of an intimate mixture of an amylaceous material and from 0.15% to 0.25% by weight of a dihydroxyphospholipid based on the weight of the molding composition.

16. The method of molding candies which comprises introducing candy into a mold consisting essentially of an intimate mixture of potato starch and from 0.15% to 0.25% by weight of a dihydroxyphospholipid based on the weight of the molding composition.

17. The method of making a molding composition for molding into stiff figures which comprises intimately mixing an amylaceous material and up to 5% by weight of a dihydroxyphospholipid based on the weight of the molding composition.

18. A molded composition consisting essentially of an intimate mixture of a moisture containing amylaceous material and a quantity of a dihydroxyphospholipid effective to stiffen said amylaceous material and to form molds that are substantially unaffected by moisture.

19. The method of molding candies which comprises intimately mixing a starch having a moisture content of about 15% to 18% by weight with from 0.15% to 0.25% by weight of a dihydroxyphospholipid based on the weight of the composition, forming a candy mold from said composition and molding candies therein.

20. The method of molding candies which comprises introducing candy into a mold consisting essentially of an intimate mixture of a potato starch having a moisture content of about 15% to 18% by weight and from 0.15% to 0.25% by weight of a dihydroxyphospholipid based on the weight of the mold, said mold being characterized by its ability to absorb relatively large amounts of moisture without becoming hard and lumpy.

ELMER F. GLABE.

REFERENCES CITED

The following references are of record in the file of this patent:

UNITED STATES PATENTS

| Number | Name | Date |
|---|---|---|
| 2,057,695 | Schwieger | Oct. 20, 1936 |
| 2,271,410 | Thurman | Jan. 27, 1942 |
| 2,445,948 | Wittcoff | July 27, 1948 |

OTHER REFERENCES

"Confectionery Standards," Stroud Jordan, Applied Sugar Laboratories, Inc., 109 Wall St., New York, 1933, pages 70–72.